United States Patent [19]

Grunewald et al.

[11] 4,292,216
[45] Sep. 29, 1981

[54] LIGNIN-BASED GLUE

[75] Inventors: Kurt H. Grunewald, Göteborg; Inge G. Månsson, Kungälv, both of Sweden

[73] Assignee: Eka Aktiebolag, Surte, Sweden

[21] Appl. No.: 102,413

[22] Filed: Dec. 11, 1979

[30] Foreign Application Priority Data

Dec. 28, 1978 [SE] Sweden .............................. 7813359

[51] Int. Cl.³ .................... C08H 5/02; C08G 8/08; C08G 12/32
[52] U.S. Cl. ................................................ 260/17.5
[58] Field of Search ........................................ 260/17.5

[56] References Cited

U.S. PATENT DOCUMENTS

| | | | |
|---|---|---|---|
| 3,216,839 | 11/1965 | Webster | 106/123 |
| 3,285,801 | 11/1966 | Sarjeant | 161/170 |
| 3,864,291 | 2/1975 | Enkvist | 260/17.5 |
| 4,105,606 | 8/1978 | Forss et al. | 260/17.5 |

FOREIGN PATENT DOCUMENTS 846812 8/1960 United Kingdom .
1404536 9/1975 United Kingdom .

*Primary Examiner*—Earl A. Neilsen
*Attorney, Agent, or Firm*—Young & Thompson

[57] ABSTRACT

A glue, substantially based on chlorolignin, for gluing cellulose materials such as wood, particle board etc. Chlorolignin, which is a waste product from the cellulose industry, is an environmentally dangerous substance. It is recovered by membrane filtering of waste liquor, separating out compounds with a molecular weight lower than 1000-2000. It is then used alone, or mixed with common synthetic glues such as melamine-formaldehyde resins, fillers, hardeners etc. Formaldehyde, paraldehyde or ammonium chloride are suitable hardeners and the chlorolignin can also be prepolymerized with formaldehyde and/or paraldehyde.

6 Claims, No Drawings

LIGNIN-BASED GLUE

The invention relates to a glue substance used in joining materials containing cellulose.

In manufacturing particle board, gluing of veneer materials and the like, inexpensive synthetic resins, such as urea formaldehyde resins or phenol formaldehyde resins are used as basic raw materials in the glues. The value of the manufactured products is low, especially when the raw materials used are wood scraps, bark, wood chips etc. To make the glue less expensive, additions of lignin products are used. Lignin is in itself a glue which holds together the cellulose fibers in the wood, and the lignin makes up about 30% of the wood substance. Lignin is a polymer which mostly consists of substituted, aromatic phenol compounds and is present in all forms of plant life. The phenolic character of the lignin makes it possible to use it to replace, for example, synthetic phenol formaldehyde resins in glue substances for wood. The lignin also has the advantage of having a three-dimensional shape, which increases the bonding capacity to the cellulose molecule in relation to phenol.

The known processes for extraction of lignin compounds are all based on sulfite or sulfate waste liquor as a raw material. U.S. Pat. Nos. 2,395,373 and 3,548,638 describe how lignin sulfonates can replace phenol formaldehyde resins in glues. Lignin sulfonates are extracted from the cooking liquid of the sulfite process, in which the lignin released from the wood has been sulfonated. In this recovery, valuable raw materials such as alkali and sulfur dioxide are used which would otherwise be returned to the process to make a new cooking liquid. Thus the cost of this product is not only determined by the capital outlay and cost of operation of the recovery plant but by the cost of the chemicals as well.

U.S. Pat. No. 3,864,291 describes a method of recovering usable lignin compounds from the cooking liquid, the so-called black liquor, in the sulfate process. Even here, the recovery costs are determined by the chemical costs as well as the process costs.

Systematic studies of the effect of lignin sulfonates on the glue characteristics have shown that the three-dimensional structure of the molecules and the reactivity of the terminal groups are important for the bonding characteristics to the wood substance. Furthermore, the low molecular compounds in the cooking liquor are not such compounds or molecules as can improve the glue characteristics. These studies have surprisingly shown that the high molecular weight chlorolignins formed in the cellulose bleaching plants are especially suited as glue substances and can thus replace lignin sulfonates with advantage. By using ultrafiltration techniques it is possible to separate suitable high-molecular weight lignin compounds from the alkali stage in cellulose bleaching, for example.

Finnish patent application No. 2527/72 describes the use of lignin sulfonate together with phenol-formaldehyde resins in the manufacture of particle board, plywood and other cellulose products.

Important glue characteristics for these purposes are joint strength and tensile strength, and the prescribed norms must be fulfilled in both dry and wet tests.

Penetration, solubility, heat resistance and sensitivity to moisture are all important if a glue is to provide a superior joint.

The glue must be able to penetrate into the abutting joint surfaces. After curing, the glue should not be able to be scraped from the surface. The glue should be insoluble in the most commonly occurring organic solvents which are used in the subsequent treatment of the surface, e.g. painting.

The glue must not lose its bonding capacity at lower or higher temperatures than normal room temperature.

The glue must not absorb moisture from the air to such a degree as to appreciably reduce the strength of the joint. Furthermore, the glue must have good film-forming characteristics; it must cover the surfaces well and have such a viscosity that the application to the glue joint surfaces is even.

The glue must also tolerate the addition of certain substances which improve the quality of the joint without changing its original characteristics. Chlorolignins in glue compositions according to the invention have all of the above mentioned characteristics.

Especially important for the practical use of a glue is the cost effectiveness. The cost of the applied glue per unit of surface area in relation to the above-mentioned characteristics, especially joint strength, must be minimized. The lignins according to the invention have such characteristics as to be very suitable in these respects. The cost effectiveness is improved further if the chlorolignins are separated out of the bleaching liquors by means of membrane techniques. It has been shown that the resin cost according to the invention is reduced by 30% in relation to the prior art.

The normal sequence in a bleaching plant includes the following steps: chlorine, alkali I, hypochlorite, chlorine dioxide, alkali II, chlorine dioxide, i.e. with the usual designation C E H D E D. Approximately 80% of the lignin in the unbleached pulp is present in the waste from the first alkali stage. It also contains other substances, both inorganic and organic. The inorganic substances include primarily NaCl and other chlorides and the organic substances include a large number of compounds, especially disintegration products, formed by breaking down the lignin under elevated temperature and hydrocarbons from the pulp hemicellulose. These products have an average molecular weight of less than 1000, and tests have shown that it is advantageous for the quality of the glue to separate these compounds from the high-molecular weight fraction in the waste liquors.

An ultrafiltration unit consists of a prefilter for removing fibers and other suspended material as well as the main filtering unit. It consists of a number of stages coupled in series, in which the E filtrate is successively reduced in volume by removal of permeate. The ultrafiltration is done at an input pressure of 5–10 bar for example, and the pressure drop over each membrane is overcome by a pressure-increasing pump. By varying the operating pressure and the temperature, load variations can be compensated for.

The ultrafiltration provides a concentrate of 20–50 kg/ton of unbleached pulp and a permeate, which is 95–98% of the incoming volume. The permeate contains molecular, organic remnants of cellulose and hydrocarbons as well as inorganic salts, such as chlorides.

The concentrate is the raw material for the glue according to the invention, while the permeate can be directly returned to the bleaching process as wash water, since it has been heated to between 60° and 70° C.

The lower boundary in the separation of suitable lignin compounds is preferably at a mean molecular weight of 1000–2000. Ultrafiltration and its use in the cellulose industry is described in detail in Revue ATiP, vol. 28, No. 1, 1974.

In the process described here, about 2-5% of the cellulose treated in the bleaching plant can be recovered for the purpose according to the invention. The method described here saves both chemicals and energy in relation to the methods used for recovering lignin sulfonates or other lignins according to the prior art.

Usual lignin sulfonate recovery uses alkali or sulfite, which can be reused in the preparation of a new cooking liquid. High-quality steam is also used for concentration of the solutions. The present method of recovering chlorolignin uses only pump energy and the lignin is eliminated from the waste solutions, which are normally the most difficult environmental toxins, from pulp production, namely the strongly colored and oxygen-consuming waste solutions from bleaching plants.

The invention will be described in more detail in the following examples.

EXAMPLE 1

For the manufacture of particle board, a glue solution was prepared containing chlorolignin, which had been separated by means of ultrafiltration from a sulfate cellulose bleaching extraction stage. The average molecular weight was greater than 10,000, and the percentage of organic material was 25%. 1 liter of commercial phenol-formaldehyde resin with 40% active material of normal industrial quality was mixed with 1 liter of the lignin solution, and 20 g of paraformaldehyde was then added, whereafter everything was mixed well for 60 minutes, and 80 g of paraffin was added. Birch chips were then sprayed with 0.3 liter of glue solution per kg chips and the chips were made into 20 mm thick three-layer boards under 30 kp/cm² pressure at 195° C. press temperature. The strength characteristics of the particle board were determined according to Swedish standards.

|  | Bending strength kp/cm² | Tensile strength kp/cm² |
|---|---|---|
| 100% phenolic resin | 290 | 9 |
| 60% phenolic resin  40% lignin | 230 | 10 |

In other respects, the requirements according to Swedish standards were fulfilled.

EXAMPLE 2

In the manufacture of plywood there was used, on the one hand, a commercial phenol-formaldehyde resin and, on the other hand, a glue containing one-half phenol-formaldehyde resin and one-half precondensed chlorolignins, which were separated out of the waste liquors of a cellulose bleaching plant by means of ultrafiltration and were thereafter condensed with formaldehyde. The commercial glue contained 32% resin (active material) and starch additives. The plywood sheets were coated in both cases with 150 g/m² per side and were finally cured under 10 kp/cm³ and 140° C. The products were tested according to SIS and the following results were obtained.

|  | Tensile strength kp/cm² | |
|---|---|---|
|  | dry | wet |
| (1) 100 parts phenolic resin | 32 | 21 |
| (2) 50/50 parts phenolic phenol/chloro-lignin resin | 33 | 22 |

In addition to the better results with the glue according to the invention, there was also a saving of about 35% in resin costs.

EXAMPLE 3

Chlorolignin has been used in combination with nitrogencontaining resin, so-called melamine-formaldehyde resin, for the manufacture of weather-proof particle board. Equal weights of melamine-formaldehyde resin and chlorolignin were mixed, and hardener in the form of ammonium chloride was added in an amount corresponding to 10% by weight of the amount of chlorolignin.

Particle boards were manufactured with an amount of glue of 0.2 liter per kg of wood chips. 20 mm thick boards were manufactured and tested according to Swedish standards. The pressure applied was 25 kp/cm² and the temperature was 180° C. The testing was done after the boards had been boiled for 2 hours at 100° C.

| Results: | | |
|---|---|---|
|  | Bending strength kp/cm² | Tensile strength kp/cm² |
| 100% melamin resin | 215 | 6 |
| 50% melamin resin  50% lignin | 230 | 5.5 |

What we claim is:

1. Glue for joining cellulose material, comprising aqueous chlorolignin with a molecular weight higher than 1000, in mixture with synthetic glue components selected from the group consisting of malamine-formaldehyde resin and phenol-formaldehyde resin, in a weight ratio between the chlorolignin and the synthetic glue components of between 100:20 and 20:80, as well as hardener and filler.

2. Glue according to claim 1, characterized by a water content of between 60 and 20% by weight.

3. Glue according to claim 1 or 2, characterized in that the hardener is formaldehyde, paraformaldehyde or ammonium chloride.

4. Glue according to claim 1, characterized in that the chlorolignin is made from waste liquors from cellulose manufacture.

5. Glue according to claim 1, characterized in that the chlorolignin comes from bleaching of cellulose pulp.

6. Glue according to claim 2, characterized by a water content between 60 and 40% by weight.

* * * * *